United States Patent [19]
Scarlatti

[11] Patent Number: 5,528,905
[45] Date of Patent: Jun. 25, 1996

[54] CONTACTOR, PARTICULARLY A VAPOUR EXCHANGER FOR THE CONTROL OF THE AIR HYGROMETRIC CONTENT, AND A DEVICE FOR AIR HANDLING

[75] Inventor: Francesco Scarlatti, Genoa, Italy

[73] Assignee: Essex Invention S.A., Panama City, Panama

[21] Appl. No.: 395,072

[22] Filed: Feb. 27, 1995

[30] Foreign Application Priority Data

Mar. 25, 1994 [IT] Italy .................................. GE94A0036
Mar. 25, 1994 [IT] Italy .................................. GE94A0035

[51] Int. Cl.$^6$ ............................ F25B 21/02; F25D 23/00
[52] U.S. Cl. ................... 62/3.4; 62/271; 165/21; 236/44 A
[58] Field of Search ...................... 422/120, 123; 96/4, 5, 14; 62/3.4, 271; 236/44 A; 165/21

[56] References Cited

U.S. PATENT DOCUMENTS 5,191,771  3/1993  Meckler .................. 62/271

FOREIGN PATENT DOCUMENTS 1261628  9/1989  Canada .......................... 62/3.4

Primary Examiner—William E. Wayner
Attorney, Agent, or Firm—Young & Thompson

[57] ABSTRACT

A contactor, particularly a vapor exchanger, working by the sorption or desorption of water vapor from or into an air stream (U) by an aqueous hygroscopic solution inside the contactor, is formed by at least a container (1, 1') with membrane walls (101) in contact with the air stream (U) whose air vapor content is to be controlled. The walls (101) of the container (1, 1') in contact with the air stream (U) are provided by many capillary open micropores so as to be impermeable to the solution but sufficiently permeable to the water vapor transfer to/from the solution. A device for handling air, particularly for dehumidification and/or humidification and air conditioning has at least one container (1) in combination with elements (6, 6'; 33, 34, 134) for adjusting the temperatures of the hygroscopic solution and/or of the air streams for controlling the transfer sense and rates of the vapor.

9 Claims, 2 Drawing Sheets

CONTACTOR, PARTICULARLY A VAPOUR EXCHANGER FOR THE CONTROL OF THE AIR HYGROMETRIC CONTENT, AND A DEVICE FOR AIR HANDLING

BACKGROUND OF THE INVENTION

1. Field of the Invention

The present invention regards a contactor, particularly a vapour exchanger, to control the air hygrometric content in dehumidification, humidification and air conditioning equipment, on the basis of sorption or desorption phenomena of water vapour taking place with water or with hygroscopic solution from or into an air stream coming from a conditioned environment and/or from or into the indoor air of the environment itself.

2. Description of the Related Art

In the known air handling processes mass exchangers which make use of hygroscopic solutions are brought into direct contact with the air either by percolating and/or spraying the liquid phase in the form of drops/droplets through the air stream or by air bubbling through a filled column. In both cases the air stream is in direct contact with the liquid phase and water vapour exchanges take place between the phases.

According to the specific application involved, the air stream, usually dehumidified by these devices, is then, further treated before being sent, for instance, into the conditioned environment.

These well known direct contact mass exchangers present some inconveniences such as:

- the absorption process is limited by the air-liquid dessicant contact area. If the contact area is increased by spraying onto extended surfaces the solution, problem arise when a high viscosity solution has to be used.
- the contact area is dependent on both the air and solution flow rate.
- air particulates and dust may progressively dirty the hygroscopic solution.
- dehumidification or humidification devices have large dimensions and their maintenance and servicing are not easy;
- high friction loss along the air path in the case of a filled column.

In all bases it is necessary to put into service high efficiency filters in order to avoid carryover of solution droplets in the handled air stream which often may cause in ducts a corrosion phenomena.

SUMMARY OF THE INVENTION

An object of the invention is to provide a contactor, particularly for air handling i. e. exchanging water vapour, of the kind described which avoids all the above mentioned troubles while presenting, at the same time, relatively simple and cheap assembling, sufficiently high mass transfer rates, a simple, sure and handy utilization and a good manufacturing adaptability to various fields of employment.

The invention achieves the above mentioned goals with a contactor, particularly for exchanging water vapour, consisting, at least of a container having a border wall or walls in direct contact with an air stream in which the vapour content is to be controlled, a hygroscopic solution being set or flowing inside the container which is sealed at all of its sides and the container's walls being provided with many capillary open pores, so as to be impermeable to the solution up to a determined maximum inside pressure of the liquid phase, but sufficiently permeable to the water vapour transfer to/from the solution.

The border walls between the air to be handled and the hygroscopic solution are formed by a hydrophobic material which may be in the form of a membrane.

Suitable microporous membranes may be made up by a thin polytetrafluoroethylene (PTFG), by a thin crystal-line poly-ethylene microfibre material tightly heat Sealed to one another, or by similar hydrophobic microporous-film while the container may assume easily any desired shape and be assembled, by heat sealing or gluing with suitable adhesives at their peripheral edges one or more properly shaped, bended or unbended membrane pieces.

Such walls with their open micropores avoid a direct contact between the moist air and the hygroscopic solution without penalizing too much the mass transport rates between these phases. The resistance to the mass transport due to the interposition of such a membrane separating said phases is widely compensated by the easier assembling of the mass exchanger, by its reduced manufacturing costs, by its more reliable, simpler and handier use. The routine maintenance of contactors is limited. The contactor is suitable for different applications since extended surfaces variable at will for the mass exchange may be easily obtained, for instance by adopting a compact modular construction.

In respect of the traditional direct contact approach the contactors according to the invention present in air handling advantages such as:

- low friction loss along the air path;
- elimination of carryover effects;
- a contact area between the phases which is independent from both the solution and the air flow rate;
- prevention of any pollution of the hygroscopic solution by dust and particulate carried by the air;
- mass exchange surfaces handily and easily variable according to need;
- a fairly good compactness with a hugh "area density", i. e. a high ratio mass transfer surface to volume; and
- particularly when using hygroscopic solutions like LiCl absence of hygienic problems upon the membrane surfaces facing air, due to the bactericide and bacteriostatic activity of LiCl preventing any micro-organism to grow.

Such contactors can be adopted without significant modifications to replace the direct contact vapour exchangers working with liquid adsorption in some known installations already in use in civil and industrial air dehumidification and conditioning.

Semipermeable membranes give easily different and quite complex shapes to mass exchangers. The membranes can be preformed during their manufacturing process; alternatively the membranes can be manufactured, for instance, in the form of tubular/plane elements, allowing also a handy assembling of differently shaped containers of the mass exchanger.

Should conditions be convenient for the use of liquid adsorption processes, for instance when thermal energy at relative low temperature is available to regenerate the hygroscopic solution, this innovative vapour exchanger, reducing or eliminating some problems typically associated with direct contact air handling processes with hygroscopic solutions ( dehumidification and conditioning) and presenting the above mentioned advantages, facilitates a more extended use of the liquid adsorption process, even when it is still popular to adopt the traditional cooling process though it requires more power consumption.

By taking advantage of these contactors a more extended use of combined systems, where both adsorption and cooling operate together, may be also foreseen for selected applications in which thermal energy at relative low temperature is available since in this case cooling power savings up to 50% are possible, for instance, for transport vehicles, small cars, with air conditioning etc.

Furthermore, also in the absence of any thermal energy sources, such combined systems may allow significant savings (up to 40–50%) of either cooling or electric power in air handling processes if, to regenerate the hygroscopic solution, the thermal energy rejected at the condenser of the cooling unit at temperatures about 40°–50° C. could be used. These important goals might be achievable by an extended area membrane contactor provided with a very thin and very permeable membrane.

Any savings of cooling power required to handle air may present a great interest in order to reduce the negative impact on the natural ambient of the C.F.C. (freon fluids) already used in the cooling cycles. As known the use of such fluids is restricted under international agreements, so that new fluids and new technologies are on the way to be studied the world over.

The invention regards also an air handling device, particularly for dehumidification/humidification, having a principal circuit for the hygroscopic solution (dehumidification/humidification circuit) in which at least a contactor according to the invention is provided for water vapour transfer from the air of the conditioned environment to be handled to the hygroscopic solution circulating through the contactor or the reverse and a second parallel circuit (regeneration circuit) in which a regenerator of the hygroscopic solution is provided for exchanging water vapour from at least part of the hygroscopic solution into the air of the outside environment or reverse, means being provided for heating or cooling at least the hygroscopic solution circulating in the regeneration circuit and/or the air of the outside environment coming in contact with the regenerator up to suitable working temperatures, thus allowing the vapour disposal from the hygroscopic solution into the external air crossing the regenerator or the reverse.

According to a further improvement in combination with the heating or cooling means of the hygroscopic solution in the regeneration circuit and/or of the external air coming in contact with the regenerator, in the principal circuit further means for adjusting the temperature and/or the composition of the hygroscopic solution in relation to the status of the air of the conditioned environment can be provided.

Advantageously also the regenerator is formed by a contactor according to the invention.

A further improvement of the invention regards a device for hygrometric stabilization of segregated premises or cases, particularly of low volume, such as museum showcases, electronic controlling units, or similar ones, having a humidification/dehumidification circuit with at least a contactor according to the invention working between the air of the segregated environment or an air stream coming from said segregated environment and a hygroscopic substance inside the contactor, a parallel regeneration circuit for the hygroscopic solution with at least a regenerator, i.e. a contactor working between the hygroscopic solution and the air of the outside environment, means for heating or cooling at least part of the total mass of the hygroscopic solution, i. e hygroscopic solution circulating through the regenerator and/or the air of the outside environment contacting the regenerator, which cooling and heating means are driven by controlling means working in relation with the hygroscopic solution concentration varying with respect to a prefixed value and which is read by suitable sensors.

The hygroscopic solution may be an aqueous solution of suitable organic substances, for instance glycerol, tryethyleneglycol or salt solutions such as LiCl, $MgCl_2$, $Ca(NO_3)_2$, or a mixture of these substances of suitable composition.

It is possible to observe that the use of a hygroscopic solution may also allow an adsorption and/or chemical neutralization of some chemical substances often present in the air in areas with sensible air pollution; for instance, it is possible to dissolve into the hygroscopic solution traces of compounds able to neutralize the polluting substances, such as $NaHCO_3$ to neuralize $NO_2$.

The invention regards also other characteristics which improve further the mass exchanger and the devices described above.

BRIEF DESCRIPTION OF THE DRAWINGS

The invention's characteristics shall be pointed out in a more extended way in the following description of non restrictive embodiments which are shown in the enclosed drawings.

Figure 1:
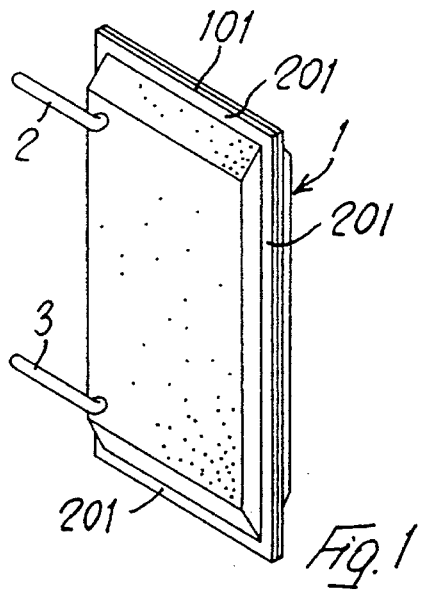
FIG. 1 shows a perspective view of an embodiment of the contactor according to the invention.

The contactor shown in FIG. 1, which is particularly suitable to control the relative air humidity inside small cases or premises, consists of a relatively small container 1 for the solution that may be manufactured like a sealed envelope.

The envelope is made by a thin porous membrane wall 101 with a highly hydrophobic behavior as regards the liquid phase and having a plurality of open microcapillaries of suitable size in order to be watertight to the hygroscopic solution contained in it (at least up to a prefixed level of the inside liquid phase pressure), while still allowing sufficiently high vapour transport rates to/from the solution itself.

Figure 4:
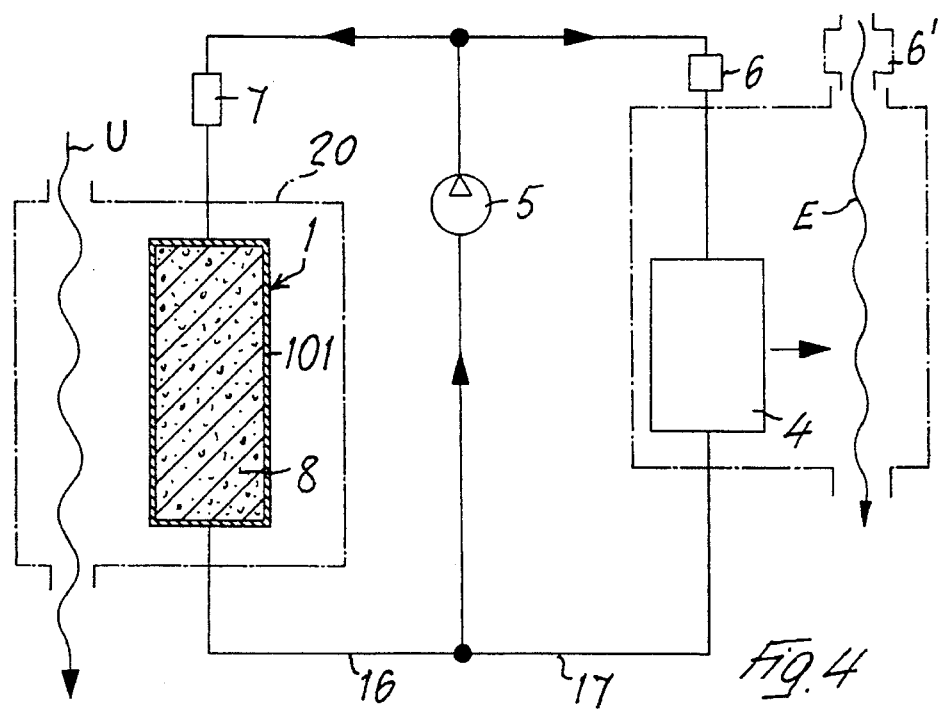
FIG. 4 shows diagrammatically a device for air handling, particularly for dehumidification, employing a contactor according to the preceding figures.

The vapour exchanger may be either used as a simple container which can be placed directly into the cases/premises or into an air handling system as for example the dehumidification system according to FIG. 4.

In FIG. 4, the moist air U to be handled comes into contact with membrane walls 101 of the container 1, where the dehumidification process takes place. The container 1 (contactor)in FIG. 1 has pipe connections for an inlet 2 and for an outlet 3 that are fitted to a principal circuit 16 (dehumidification/humidification circuit )in FIG. 4 in which the hygroscopic solution flows. A pump allows slow circulation of the hygroscopic solution. In parallel to this circuit, another circuit 17 is provided to regenerate the hygroscopic solution. In this last circuit; 17 regeneration circuit) a fraction of the solution flow rate crosses a regenerator (a second vapour exchanger) 4 where the solution is concentrated. The regenerator 4 which may be also of whatsoever kind, is a contactor like the container 1. The container 1 is set into a unit 20 segregated from the environment, the air of which has to be handled. The stream of moist air U to be handled crosses through the unit 20.

A heat exchanger V is provided upstream of the container to control suitably the working temperature of the hygroscopic in solution the principal dehumidification/humidification circuit 16. By adjusting both the solution temperature and its working composition in relation to the moist air status and/or adjusting the air stream temperature it is possible to control the hygrometric content of the air at the outlet of the contactor 1. In the regeneration circuit 17, always referring to the same flow sense, the solution or ; external air E or both are suitably heated/cooled by heat exchangers 6 and 6' up to suitable working temperatures of these fluids, thus allowing the vapour disposal from the hygroscopic solution into the external air E crossing the regenerator 4 or the reverse.

Figure 5:
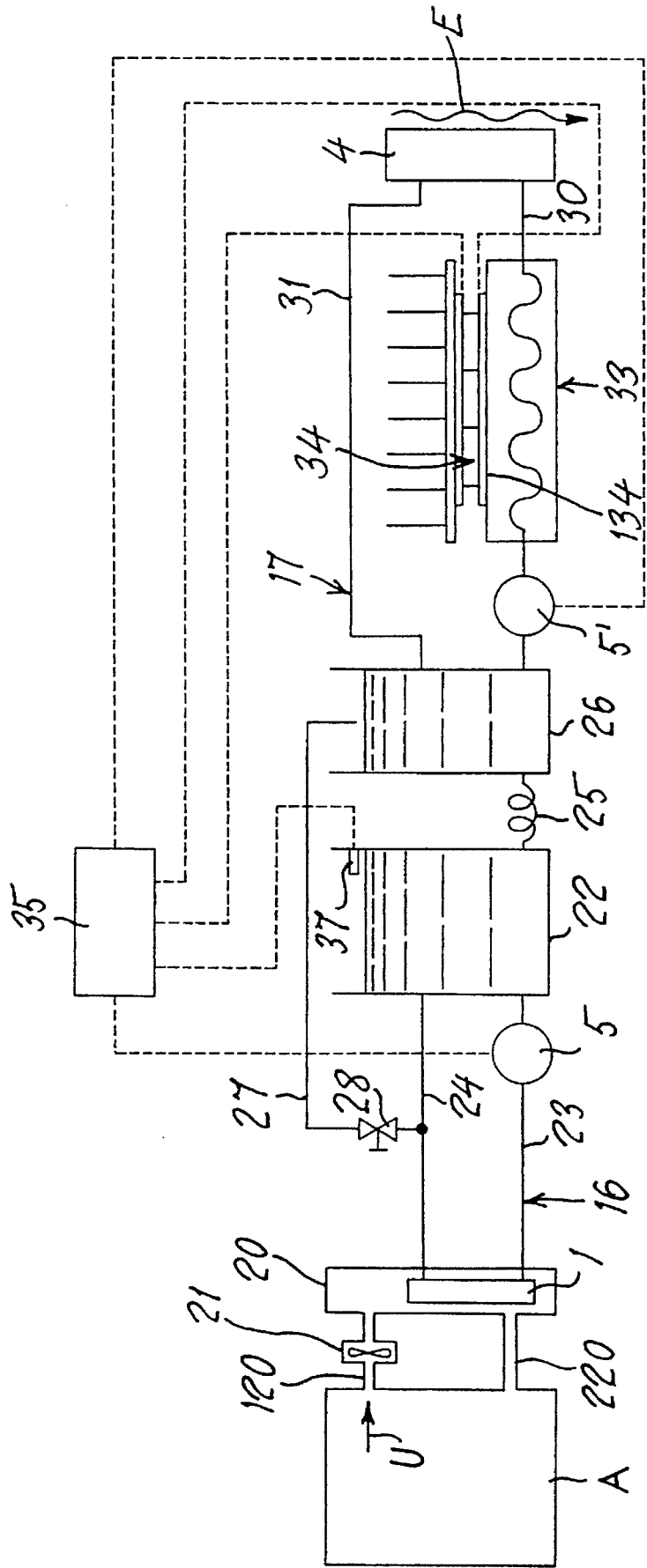
FIG. 5 shows a device for automatically controlling and stabilizing the relative air humidity in a segregated environment of low volume, as for example museum showcases or similar units applying contactors according to the invention.

As shown in FIG. 5 in relation to a further embodiment of the invention, both the principal dehumidification/humidification circuit 16 and the regeneration circuit 17 may depart from and return either to a common plenum container for the hygroscopic solution or to separate plenum and regeneration containers, each one associated with one circuit and communicating one with the other.

In order to distribute the solution flow over the section of the container 1, inside of this one, a suitable porous filling 8 may be provided, for instance, in FIG. 4 as a synthetic felt material or the like.

Suitable microporous semipermeable membranes may be made up by a thin polytetrafluoroethylene (PTFG), by a thin polyethylene microfibre material stochastically oriented and tightly heat-sealed to one another, or by similar hydrophobic microporous film. Suitable membranes of these kinds are already on sale, for instance by Du Pont de Nemours with the trademark® as Tyvek®L-1056B or by Gore Associated with the trademark Gore-Tex®.

Such membranes may be easily connected to each other by heat sealing or gluing so that the container (contractor) 1 of FIG. 1 may be economically assembled by heat sealing or by gluing with suitable adhesives a border strip 201 of a membrane piece bended on itself on two or more membrane walls 101.

Figure 3:
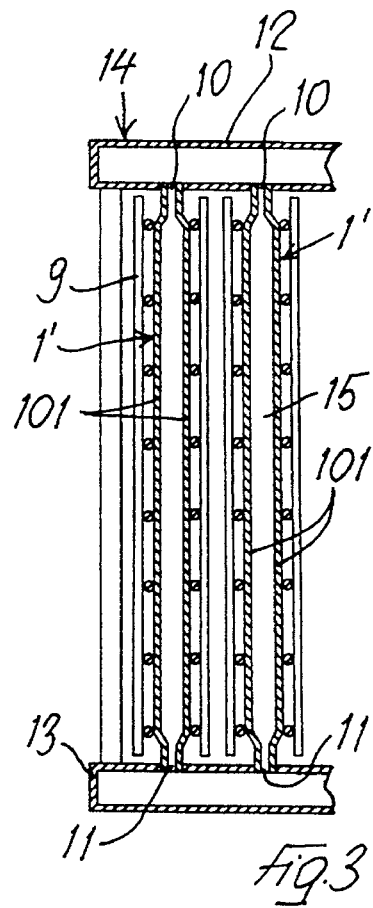

Any kind of shape of the container 1 is possible. FIG. 3 and 4 show another embodiment of the vapour contactor which is suitable to be adopted for industrial applications, for instance an for air dehumidification purpose and/or also for civil air conditioning.

Many containers 1', in a form of hollow envelopes manufactured by using a semipermeable membrane wall 101 similar to the above mentioned ones, are connected at each opposite extremity 10, 11 to the feeding and returning pipes by means of common manifolds 12 and 1S, forming two opposite sides of a supporting frame 14. The containers 1' are sealed along their vertical edges for instance by heat sealing, by gluing or by suitably clamping the vertical edges of two membranes walls 101. The containers 1' are spaced from each other in order to let suitable interspaces 15 through which the moist air stream U to be handled crosses.

In order to reduce any deformation of the containers, for instance bellying due to both static or dynamic contributions to the inside liquid press Are, these containers 1' may be wrapped up by a carrying structure 9 in the form of a reticulated holder extending all around them.

As for the preceding example, these containers 1' may be equipped with suitable internal porous filling (not shown).

In a further embodiment (not shown), in place of a plurality of containers 1' the contactor may consist of vapour exchanging modules providing membrane self-supporting tubular elements (diameter ranging from about 1 to 5 mm) in which the hygroscopic solution flows. By means of such tubular elements or also by using other assembling geometries, exchange surfaces per unit volume around 1500–2000 $m^2/m^3$ may be easily obtained. Values as high as 5000÷1000 $m^2/m^3$ can be obtained with lower diameter hollow membrane fiber contactors.

The vapour exchange rates, taking place between moist air and a hygroscopic aqueous solution through such a membrane, is governed by gradients of the chemical potentials of the water in the two phases, i.e. by gradients of both partial vapour pressure and temperature. By means of a vapour exchanger, i.e. a contactor similar to the one in FIG. 1, an experimental investigation was performed. The container 1 was made of Tyvek® L-1056B membrane manufactured by Du Pont de Nemours. The membrane characteristics were: mass per unit area about 55 $gr/m^2$ thickness 0.17 mm having resistance to water penetration up to a pressure difference of about 10000 Pa.

The vapour transfer rates between moist air and a saturated LiCl solution (absorption rates) measured at 21° C. in isothermal conditions (mass transfer only controlled by the water vapour partial pressure difference) were about 0.038 $g/(m^2hPa)$ in still air while with air n forced convection higher values of the order of 0.078–0.084 $g/(m^2hPa)$ were observed, at least for air velocities ranging from 1 to 3 m/s.

In absence of partial pressure gradients, but in no isothermal conditions, the thermal driven vapour flow through such membrane (desorption rates) was also noticeable, for instance a vapour flow rate of about 290 $g/(m^2h)$ was observed from a colder $Ca(NO_3)_2$ (56% in mass) solution at 38° C. to, an air stream heated, up to 65° C., at least for air velocities around 2–3 m/s. The air had a specific humidity of 6.2 g/kg.

Finally in relation to the handled air status, the vapour transfer rates throughout such membranes may be then controlled by adjusting suitably the solution composition and/or the temperatures of the two phases. It is also possible, if required, to make use of more diluted solutions or pure water adjusting the phases temperatures to suitably control the sense of the vapour exchanges.

Theoretical simulations have pointed out that very high vapour transfer rates between a hygroscopic solution and a warmer air stream could be reached by adopting thinner and more permeable membranes such as, for instance, a 25–30 microns, thick polytetrafluoroethylene (PTFG) Gore-Tex® membrane.

For instance absorption rates of about 1000–1200 $gr/(m^2h)$ and desorption rates up to 7000 $gr/(m^2h)$ can be reached according to the solution temperature. The application of this technology may have a very great development potentially allowing also significant energy and cooling power savings with respect to the traditional cooling process. For instance, air handling combined systems ( adsorption +cooling) may be foreseen in which to regenerate the solution, thus the thermal energy rejected at the condenser of the cooling unit at temperatures of about 40°–50° C. could be used. In this temperature range the desorption vapour flow of nearly 200–500 $gr/(m^2h)$ can be obtained. These important goals might be achievable by an extended area membrane vapour exchanger provided with a very thin and very permeable membrane.

Figure 2:
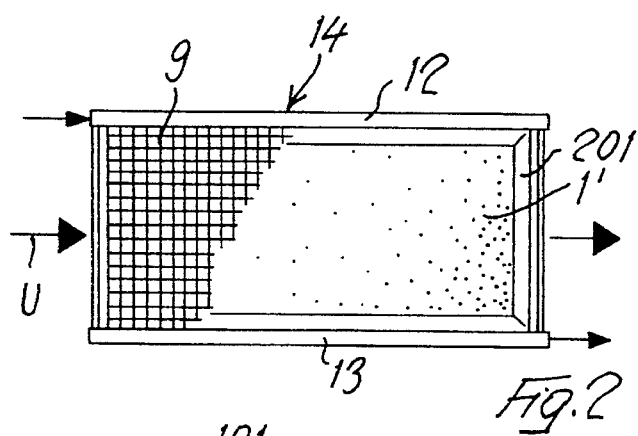
FIG. 2 and FIG. 3 show a further embodiment of the mass exchanger according to the invention.

FIG. 5 shows an advantageous embodiment of the device according the invention particularly suitable for the automatic hygrometric control of small volume segregated premises. A segregated environment A, particularly of small volume, is set in communication with a contactor 1 in a separate unit 20 by means of ducts 120, 220, allowing the circulation of a moist air flow U coming from the environment A. The vapour exchange takes place between the hygroscopic solution and the air inside the environment. The air circulation is maintained by of a small fan 21. The sense of such vapour exchanges may be from the solution to the air or the reverse. Every kind of vapour exchanger having the above mentioned characteristics may be used, for instance, vapour exchangers according to FIG. 1 or FIGS. 2 and 3.

The principal circuit 16 comprises the contactor 1 and a first plenum container 22 connected together by a feeding pipe 24 and a return pipe 28. The liquid circulation between the plenum container 22 and the contactor 1 is maintained by the small pump 5.

At its bottom the plenum container 22 is connected with the bottom of a second smaller regeneration container 26 through a copper coil pipe 25 allowing a fairly good heat exchange with the surrounding ambient, atmosphere. In the return pipe 23 or in the feeding 24 pipe respectively from or to the contractor exchangers 1 there is a branch 27 debouching into the regeneration container 26. The branch 27 is supplied by a throttling valve 28 to adjust the solution flow rate.

The second regeneration container 26 is part of the regeneration circuit 17 and is connected to a, regenerator 4 by a feeding pipe 30 and a return pipe 31, while another pump 5' allows the liquid circulation throughout the regenerator 4. The regenerator 4 is a second vapour exchanger set outside the segregated environment A working to perform vapour exchanges between the hygroscopic solution and the external air E either from the air into the solution or the reverse.

The regenerator 4 may be similar to the above container 1 which is in communication with the segregated environment A. In the regeneration container 26 or in the pipe 30 feeding the regenerator 4 there is a heat exchanging element 33 which, for instance, could consist of a coil excavated in an aluminium plate set in thermal direct contact with one of two plane bases 134 of a thermoelectric Peltier element 34. The thermoelectric element 34 is fed by a direct current having a suitable polarity which allows either to heat or to cool progressively the an operator hygroscopic solution inside the regeneration container 26 up to suitable working temperatures which cause the concentration or the dilution of the solution as a consequence of the positive or negative vapour exchanges taking place with the surrounding external air E. Alternatively or in combination with the heating or cooling of the solution, it is also possible to heat or to cool the air in contact with the porous walls of the regeneration container 26 by a thermoelectric element similar to the Peltier elements 34.

Therefore any positive or negative concentration variation occurring inside the regeneration container 26 is going to be replicated in the whole solution mass as a consequence of a prefixed very modest liquid circulation between the containers which circulation is allowed throughout the adjustable flow branch 27 and the valve 28 by the communication coil pipe 25 at the bottom of the containers 22, 26.

The liquid level in the plenum container 22 is always correlated to the solution concentration since both the liquid levels are going to be always almost equal according to the communicating vessels principle. As a consequence the liquid level inside the plenum container 22 may be monitored in order to start the regeneration process either in one sense or in reverse, i. e. in order to start the pump 5' and to feed the Peltier element 34 with an electric direct current with suitable polarity.

Since the positive/negative thermal fluxes exchanged by the solution in the Peltier element 34 may be controlled at will, both in sense (positive/negative) and/or in entity by both the polarity and the electric voltage applied, in order to nearly equalize these regeneration thermal exchanges (positive/negative) suitable electric polarity with prefixed different voltages should be fed.

At the bottom of the two containers 22, 26, the communication coil 25 (it may be made as a copper coil of about 5 mm diameter) allow the flowing solution to be nearly in thermal equilibrium with the surrounding environment as a consequence of the very modest liquid flow rate which is recirculated from the regeneration container 26 to the plenum container 22. When the regenerator 4 is crossed by a heated solution or the air contacting this last one is heated a vapour flow from the liquid solution to the surrounding external air E takes place while the reverse happens when the liquid or the air is cooled. Such negative/positive vapour exchanges bring about respectively, an increased or a decreased concentration of the hygroscopic solution, this last one controlling the relative air humidity in the environment A.

An electronic unit 35 having a setting point gauged to a prefixed air humidity, i.e. to a solution concentration, is used to select the polarity, to start the pump 5' and to supply the suitable prefixed electric voltage to the Peltier element 34.

The effective value of the hygroscopic solution concentration: is read by one or more than one sensor transducers 37. The sensor transducers 37 may be of whatsoever kind.

The control unit 35 is provided with means for reading a prefixed reference value of the solution concentration and means for comparing the signal furnished by the sensor 37 with the prefixed one, which means select the polarity and supply the suitable prefixed voltage to the Peltier element 34 until a prefixed (difference between the two signals exist, taking into account the observed difference between the signals.

According to FIG. 5, it is possible to adopt either a simple liquid level sensor 37 set inside the plenum container 22 or a relative air humidity sensor. In this last case, he plenum container 22 is to be sealed and the sensor 37 reads the relative air humidity in the air space above the solution or in a suitable unit in open communication with the air space. Also in the absence of the regeneration processes, the total solution mass inside the device works as a passive controlling system with a very great moisture buffering capacity which, alone, may be able to damp, at least for a period of time, the air humidity fluctuations inside the environment A.

When possible (i.e. in climatic conditions where the annual average relative humidity does not differ from the desired one inside the environment A) a fully passive control of the air may be usefully obtained by the present device. In this case the regeneration process of the solution may be eliminated from the present device, which could work only by taking advantage of a suitable volumetric capacity of the plenum container 22 connected to the vapour (contractor 1 set inside or in communication with the environment A and with the pump 5 allowing liquid circulation throughout the components. The total solution mass and so its moisture buffering capacity may be easily varied and adjusted to needs.

Inside the premises/cases repeated air humidity fluctuations of short periods ( such as a few hours ) are particularly dangerous for suitable conservation of goods such as many historical and cultural works. With the device according to the invention a continuously maintenance free working and fully automatic control of the inside relative humidity around a prefixed value in a segregated premise/case is achieved. By maintaining the hygroscopic solution's concentration prefixed and constant, it is possible to control the relative air humidity around the wanted level inside the premise/case. Such device, exchanging water vapour in two senses, from/to the inside air, is then suitable to stabilize the inside relative air humidity, thus damping the climatic fluctuations (temperature and/or vapour content) occurring in the surrounding environment. Furthermore also the quantity of hygroscopic solution is held low and the construction of the device is very simple and economic.

The device for the hygrometric control of small volume segregated premises which have been described above is particularly advantageous in combination with contactors of the type according to the invention. Nevertheless, the device for hygrometric control achieves functional improvements also when, instead of contactors according to the invention for the vapour exchanger working with the air to be handled and/or for the regenerator or for both, mass exchangers, of the known traditional type are employed.

I claim:

1. A device for handling air in an enclosed environment (A) of low volume, such as a museum showcase, said device comprising:

a unit (20) connected to the enclosed environment (A);

a principal fluid circuit (16) having at least one contactor (1) directly set inside the unit (20);

regenerator means (4), placed outside the enclosed environment (A), for exchanging heat between a hygroscopic solution passing therethrough and external air (E);

a fluid regeneration circuit (17) connected between the principal fluid circuit (16) and the regenerator means (4); and means (6' in FIG. 4; 33, 34, 134 in FIG. 5) for heating and cooling alternatively the external air (E), handled by the regenerator means (4), to selected working temperatures;

whereby vapor exchanges occur in two senses between the enclosed environment (A) at one end and the regenerator means (4) at an opposite end.

2. A device according to claim 1, wherein the heating and cooling means (6', 33, 34, 134) includes a first thermoelectric Peltier element (34) having at least one plane base (134) in thermal contact with a heat exchanger (33) which, in turn, is in contact with at least a portion of the hygroscopic solution that is fed into the regenerator means (4) and a second thermoelectric Peltier element (6') which, in turn, is in contact with the external air (E).

3. A device according to claim 2, wherein the first Peltier element (34) is fed by a direct current having a polarity which allows one of the heating and cooling of the hygroscopic solution to the selected working temperatures.

4. A device according to claim 3, further comprising:

an electronic control unit (35) and a sensor (37) which together perform one of positive and negative heat exchanges using the first Peltier element (34) and the second Peltier element (6').

5. A device according to claim 4, wherein the electronic control unit (35) drives the heating and cooling means (6', 33, 34, 134) and includes an electric feeding line for a pump (5) fixed in the principal fluid circuit (1).

6. A device according to claim 1, further comprising:

fan means (21) for circulating an air flow between the enclosed environment (A) and the unit (20);

a plenum container (22) associated with the principal fluid circuit (16);

a regeneration container (26) associated with the fluid regeneration circuit (17);

communication coil means (25) for connecting the plenum container (22) to the regeneration container (26);

branch pipe means (27) for connecting the regeneration container (26) to the principal fluid circuit (16); and throttle valve means (28), fixed into the branch pipe means (27), for adjusting a liquid flow rate therethrough.

7. A device according to claim 6, wherein the communication coil means (25) is a copper coil with a small diameter which allows a predetermined flow of liquid to be recirculated from the regeneration container (26) into the plenum container (22) so that both containers (22, 26) are almost always in thermal equilibrium with the external air (E).

8. A device according to claim 6, wherein the sensor (37) is set inside the plenum container (22) above liquid therein in order to read a variation in a concentration of the hygroscopic solution with respect to a prefixed value.

9. A device according to claim 6, further comprising:

pump means (5), fixed in the principal fluid circuit (16), for adjusting capacity in the plenum container (22) in order to control long-period air humidity fluctuations inside the enclosed environment (A).

* * * * *